United States Patent
Schwarz et al.

(10) Patent No.: US 10,852,397 B2
(45) Date of Patent: Dec. 1, 2020

(54) LIDAR DEVICE AND METHOD FOR SCANNING A SCAN ANGLE

(71) Applicant: Robert Bosch GmbH, Stuttgart (DE)

(72) Inventors: Hans-Jochen Schwarz, Stuttgart (DE); Stefan Spiessberger, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 387 days.

(21) Appl. No.: 15/935,171

(22) Filed: Mar. 26, 2018

(65) Prior Publication Data
US 2018/0284236 A1 Oct. 4, 2018

(30) Foreign Application Priority Data
Apr. 3, 2017 (DE) .................. 10 2017 205 623

(51) Int. Cl.
 *G01S 7/00* (2006.01)
 *G01S 7/481* (2006.01)
(52) U.S. Cl.
 CPC .......... *G01S 7/4817* (2013.01); *G01S 7/4815* (2013.01)
(58) Field of Classification Search
 USPC ....................................................... 356/5.01
 See application file for complete search history.

(56) References Cited

U.S. PATENT DOCUMENTS

| | | | | |
|---|---|---|---|---|
| 7,161,664 B2* | 1/2007 | Buermann | ............ | G01B 11/02 356/3.1 |
| 7,248,342 B1* | 7/2007 | Degnan | .................... | G01C 3/08 342/120 |
| 8,493,445 B2* | 7/2013 | Degnan, III | ............ | G01S 17/89 348/117 |
| 8,773,644 B2* | 7/2014 | Suzuki | .................. | G01S 7/4817 356/3.01 |
| 8,988,664 B2* | 3/2015 | Suzuki | .................... | G01S 17/02 356/3.01 |
| 9,188,674 B2* | 11/2015 | Suzuki | .................. | G01S 7/4817 |
| 9,360,554 B2* | 6/2016 | Retterath | .............. | G01S 17/931 |
| 9,857,468 B1* | 1/2018 | Eichenholz | ........... | G01S 7/4818 |
| 9,869,754 B1* | 1/2018 | Campbell | ............. | G01S 7/4815 |
| 10,036,801 B2* | 7/2018 | Retterath | .............. | G01S 7/4802 |
| 10,061,027 B2* | 8/2018 | Goldberg | ................ | G01S 17/42 |
| 2005/0225742 A1* | 10/2005 | Buermann | .............. | G01S 17/46 356/4.01 |
| 2007/0279615 A1* | 12/2007 | Degnan | ................... | G01S 7/499 356/4.01 |
| 2013/0077083 A1* | 3/2013 | Suzuki | ............... | G02B 27/0031 356/4.01 |

(Continued)

FOREIGN PATENT DOCUMENTS

| | | | | |
|---|---|---|---|---|
| DE | 19952712 A1 | 5/2001 | | |
| EP | 1177605 B1 * | 10/2005 | ........... | H01L 33/486 |

OTHER PUBLICATIONS

English Machine Translation of DE 19952712 (Year: 2001).*

*Primary Examiner* — James R Hulka
(74) *Attorney, Agent, or Firm* — Norton Rose Fulbright US LLP; Gerard Messina

(57) ABSTRACT

A method for scanning a scan angle in which at least two beams are generated. The at least two beams are deflected along the scan angle, and the at least two incident beams reflected on an object are received and detected, the at least two beams being generated and detected in an offset manner with respect to one another. Furthermore, a LIDAR device for scanning a scan angle is also described.

11 Claims, 4 Drawing Sheets

(56) References Cited

U.S. PATENT DOCUMENTS

| | | | |
|---|---|---|---|
| 2013/0229645 A1 | 9/2013 | Suzuki et al. | |
| 2014/0009747 A1* | 1/2014 | Suzuki | G01S 7/4817 356/4.01 |
| 2015/0241562 A1* | 8/2015 | Goldberg | H01L 31/09 356/3.11 |
| 2015/0293228 A1* | 10/2015 | Retterath | G01S 7/481 356/5.01 |
| 2016/0259038 A1* | 9/2016 | Retterath | G01S 7/4815 |
| 2018/0024241 A1* | 1/2018 | Eichenholz | H01S 5/4012 356/5.01 |
| 2018/0275249 A1* | 9/2018 | Campbell | G01S 7/4817 |

* cited by examiner

LIDAR DEVICE AND METHOD FOR SCANNING A SCAN ANGLE

CROSS REFERENCE

The present application claims the benefit under 35 U.S.C. § 119 of German Patent Application No. DE 102017205623.1 filed on Apr. 3, 2017, which is expressly incorporated herein by reference in its entirety.

FIELD

The present invention relates to a method for scanning a scan angle as well as to a LIDAR device for scanning a scan angle.

BACKGROUND INFORMATION

When working with semiconductor lasers as radiation sources for LIDAR (light detection and ranging) devices, the achievable output power depends in particular on an optical power density of an emission surface of the semiconductor laser.

If the power density is too high, this can result in the destruction of the semiconductor laser. In semiconductor lasers that are realized as edge emitters, the emission surface may therefore be increased by widening the emission surface. Edge emitters cannot be realized in an arbitrary width, however, since undesired modes producing high losses would form in the process. Instead, individual edge emitters are realized having widths up to 400 μm and additional edge emitters are places next to them at a distance. This structure is called a laser bar. It is possible to achieve a high-contrast illumination at a distance by projecting the near field of a semiconductor laser. Normally, it is possible for this purpose to place a lens precisely at the distance of the focal length of the lens from the emission surface. In this form of projection, however, the spaces between the edge emitters produce gaps in the illumination. Analogous gaps in the illumination also arise when using semiconductor lasers as surface emitters.

SUMMARY

An object of the present invention is to provide a LIDAR device and a method that allow for a gapless illumination of a scan angle.

Advantageous developments of the present invention are described herein.

According to one aspect of the present invention, a method is provided for scanning a scan angle. For this purpose, at least two beams are generated by at least two beam sources, are deflected along the scan angle by a deflection unit, the at least two incident beams reflected on an object are received by a receiving unit and subsequently detected, the at least two beams being generated and detected in an offset manner with respect to one another.

The at least two beams are produced by at least one first beam source and by at least one second beam source. The at least one beam source and the at least one second beam source may be implemented for example as semiconductor lasers. Both the at least one first beam source as well as the at least one second beam source may each be implemented as semiconductor bars. Together, the at least one first beam source and the at least one second beam source may form a stack or a beam source stack. The at least one first beam source and the at least one second beam source each have at least one area that cannot be illuminated by the respective beam source itself. This results in particular from spaces between emission surfaces of the beam sources because of a limited extension of the emission surfaces for avoiding undesired modes of the respective beam sources. The generated beams are deflected via an optical system and a deflection unit or deflection mirror along the scan angle. Since a near field of the beam sources is projected over a greater distance, the distances between the emission surfaces of the beam sources become greater with increasing distance as illumination gaps or scanning gaps. When working with at least two beam sources, the at least one first beam source is able to illuminate or scan at least one scanning gap of the at least one second beam source. For this purpose, for example, at least two beam sources offset with respect to one another in a checkered pattern are able to achieve a checkered pattern-like scanning of the scan angle. By deflecting the generated beams, the respective beams are deflected in an offset manner along the scan angle and are received in an offset manner. That is to say that it is possible to fill scanning gaps of at least one first beam source by subsequent offset beam sources. The scanning angle in this connection may be a solid angle. The respective emission surfaces of the beam sources for this purpose may have the same geometry and size; alternatively, it is possible for the geometry and/or the size of the emission surfaces to vary.

According to one exemplary embodiment of the method, the at least two beams are generated in an angularly offset manner with respect to one another. For this purpose, the beam sources may be disposed in an angularly offset manner with respect to one another. The beam sources may be developed as connected to one another or integrally developed in the form of a beam source stack or may also be disposed separately. This makes it possible to achieve an offset beam guidance that has an increasing offset as a function of a distance from a beam source or a deflection unit. Alternatively or additionally, it is possible for the emission surfaces of the beam sources to be indeed in one plane, but to be arranged at an angle in order to produce tilted linear beams. In another advantageous development, a cross-shaped illumination is able to reduce blooming effects.

According to another exemplary embodiment of the method, the at least two beams are generated and/or detected in a spatially offset manner. In this instance, for example, multiple first beam sources form a first beam source bar and multiple second beam sources form a second beam source bar. Both bars may be situated in a shifted or offset manner with respect to each other in such a way that the emission surfaces of the first beam source bar are positioned next to the areas between the emission surfaces of the second beam source bar and vice versa. In this instance, the number of beam source bars combined to form a stack is not limited to two. Rather, the number of possible beam source bars in a stack is to be understood as at least two beam source bars. The emission surfaces may overlap at least in regions.

Alternatively or additionally, the areas between the emission surfaces of the beam sources may also be larger so that the at least two beam source bars are able to complement one another with respect to the illumination in optimized fashion. By using spatially offset stacked beam sources it is possible to produce a checkered illumination. A great advantage of this arrangement is that a stacked beam source bar or laser bar is able to provide more optical output than a single beam source bar, yet the inductance increases only slightly since no additional electrical lines are required for this purpose. A low inductance is decisive especially for achieving very brief pulses. Furthermore, it is possible to design the individual bars in such a way that in the end an illumination results in a continuous row without gaps. This is not possible in the case of a near field projection of an individual beam source bar. On the detector side, it is here likewise possible to use, in accordance with the number of beam sources or stacks, at least two rows or a detector array having an adapted size for resolving the checkered illumination. It is thus possible to stack as many bars of beam sources as desired. The number of required detector rows or detector cells then also rises accordingly. Different detector cells preferably detect reflected first beams and reflected second beams and possible additional beams. It is possible, for example, for every second detector cell of a detector to detect the reflected beams of the second beam sources.

According to another exemplary embodiment, the at least two beams are generated and/or detected in a time-staggered manner with respect to one another. In this instance, it is possible for the at least two beams to be generated within at least one beam source bar. In particular, it is possible for the at least one beam source bar to have a plurality of emission surfaces, which are arranged, if possible, without spaces in between them and are numbered consecutively. Thus, it is possible, for example, that at a first time uneven numbered beam sources are activated to generate multiple first beams. At a second time, even numbered beam sources may be activated to generate multiple second beams. This may be continued depending on the number of beam source bars and may subsequently be repeated. This creates a time-staggered checkered pattern of generated beams that may be deflected via a scan angle. The beams generated at the first and at the second time that are reflected on an object may likewise be detected by a detector in a time-staggered fashion and subsequently be joined or cumulated to form a gaplessly scanned scan area or scan angle. Even in spatially offset beam sources, the reflected beams are detected in a time-staggered manner due to the deflection of the generated beams and due to a certain angular velocity of the deflection unit.

According to another aspect of the present invention, a LIDAR device for scanning a scan angle is provided. The LIDAR device has at least two beam sources for generating at least two beams and a deflection unit for deflecting the at least two beams along the scan angle. A receiving unit of the LIDAR device receives the at least two incident beams reflected on an object and guides them onto at least one detector, the at least two beam sources being offset with respect to one another and at least one first beam source closing at least one scanning gap of the at least one second beam source.

Since emission surfaces of beam sources cannot be designed to be arbitrarily large or long, multiple beam sources may be combined. Due to their construction and electrical and mechanical connections, the emission surfaces of the beam sources are spaced apart from one another. This space or a plurality of spaces in the case of a corresponding number of combined beam sources cause illumination gaps in a scanning process of the scan angle. The at least two beam sources are here arranged in such a way that the beams generated by the emission surfaces overlap in regions or run side-by-side without a gap. This may be achieved for example by multiple rows of beam sources being offset with respect to one another. This makes it possible for the generated beams to be spaced in an offset manner with respect to one another. Optionally, the beam sources may be arranged in a checkered pattern. The beams generated in an offset manner are deflected by the deflection unit along the scan angle and thus combined or cumulated are able to illuminate the scan angle without gaps.

According to one exemplary embodiment of the LIDAR device, the at least one first beam source closes the at least one scanning gap of the at least one second beam source in a time-staggered manner. The beams generated in an offset manner are respectively used for scanning a specific scanning region within the scan angle. Thus a first beam, for example, is able to illuminate a first row or a first strip-shaped scanning area and a second beam shortly thereafter is able to illuminate a second scanning area situated below the first strip-shaped scanning area. Due to the spatial offset of the beam sources and the generated beams, the second strip-shaped scanning area is illuminated in a time-staggered manner, for example, as a function of an angular velocity of the deflection unit. This allows for the beam sources to be spaced apart from one another such that the beam sources are not able to influence one another negatively.

According to another example embodiment, the at least two beam sources are edge-emitting semiconductor lasers or surface-emitting semiconductor lasers. The at least two beam sources may be developed as semiconductor lasers. Advantageously, the semiconductor lasers are implemented in an edge-emitting design and are offset in such a way that the emission surfaces form a checkered pattern. Alternatively or additionally, such a checkered pattern may also be realized by surface emitters such as for example VCSEL (vertical cavity surface emitting laser) or VeCSEL (vertical external cavity surface emitting laser). For this purpose, the emission surfaces are likewise designed in a checkered pattern and are projected via an optical system into a distance.

According to another exemplary embodiment of the LIDAR device, the at least one first beam source and the at least one second beam source are respectively embodied as a bar and together form a stack. This makes it possible to achieve a higher output density of the beam sources. An inductance of the stack is increased only slightly in the process so that in particular high-frequency applications having briefly pulsed beams will experience at most slight limitations.

According to another exemplary embodiment, the at least two bars of the stack are connected to one another via at least one common electrode. This allows for the distance between the emission surfaces of two beam source bars to be smaller. The smaller distance allows for a reduction in a time delay in the process of scanning the scan angle.

Below, preferred exemplary embodiments of the present invention are explained in more detail with reference to the figures.

Figure 4A:
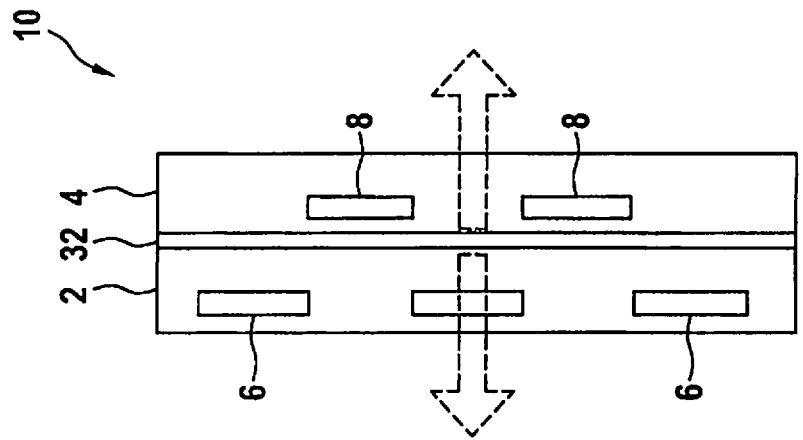

FIG. 4a,b show schematic representations of beam source stacks.

Identical constructional elements have the same reference numerals in the figures.

DETAILED DESCRIPTION OF EXAMPLE EMBODIMENTS

Figure 1:
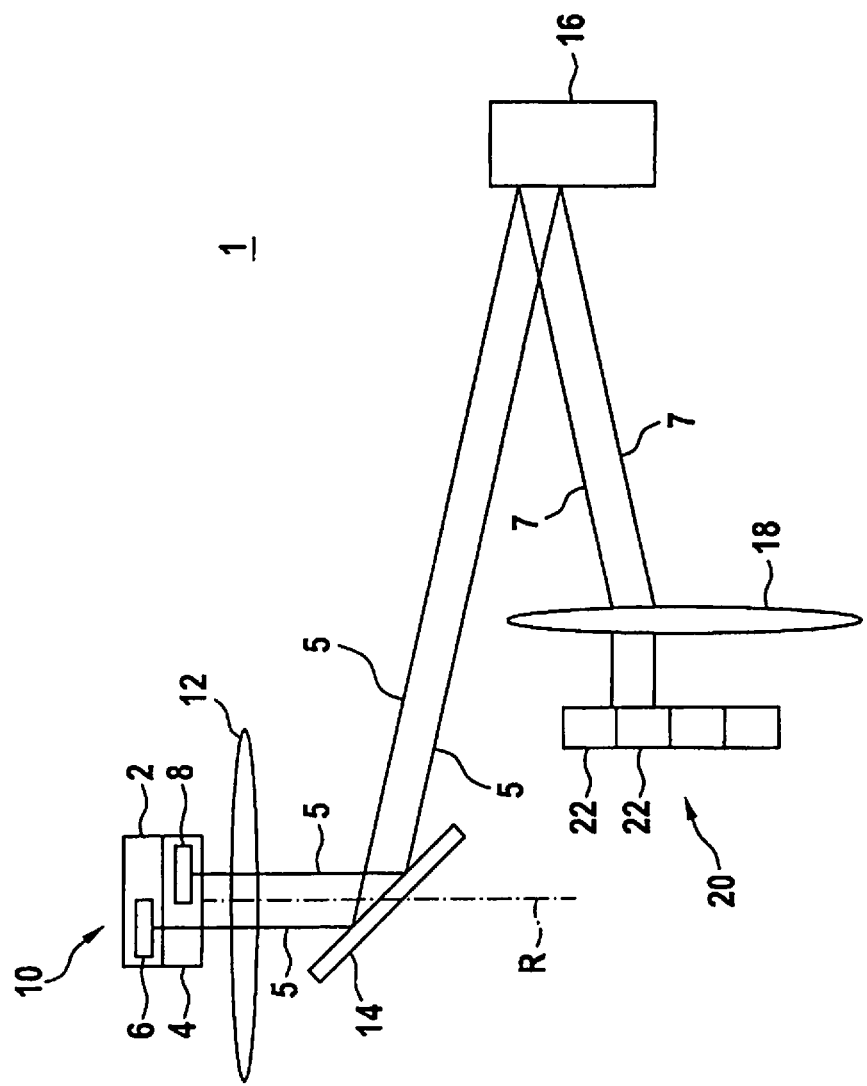
FIG. 1 shows a schematic representation of a LIDAR device according to a first exemplary embodiment.

FIG. 1 shows a LIDAR device 1 according to a first exemplary embodiment. LIDAR device 1 has a first beam source 2 and a second beam source 4, which each have one emission surface 6, 8. Emission surfaces 6, 8 are arranged in an offset manner with respect to each other and form an overlap area. No projection gap is thus produced between the beams 5 generated by emission surfaces 6, 8. Both beam sources 2, 4 are combined to form a stack 10. The beams 5 generated in an offset manner are projected via an optical system 12 onto a deflection unit 14. According to the exemplary embodiment, deflection unit 14 is a rotatable mirror 14, which along an axis of rotation R deflects the generated beams 5 along a scan angle. The generated beams 5 may strike an object 16, if object 16 is located in the scan angle. Generated beams 5 are reflected on object 16 to form reflected beams 7 which are guided by a receiving unit 18 onto a detector 20. Detector 20 is made up of multiple detector cells 22, which are able to detect and identify the reflected beams 7 in a spatially resolved and temporally resolved manner as a function of a distribution of beam sources 2, 4 or of emission surfaces 6, 8 of beam sources 2, 4.

Figure 2:
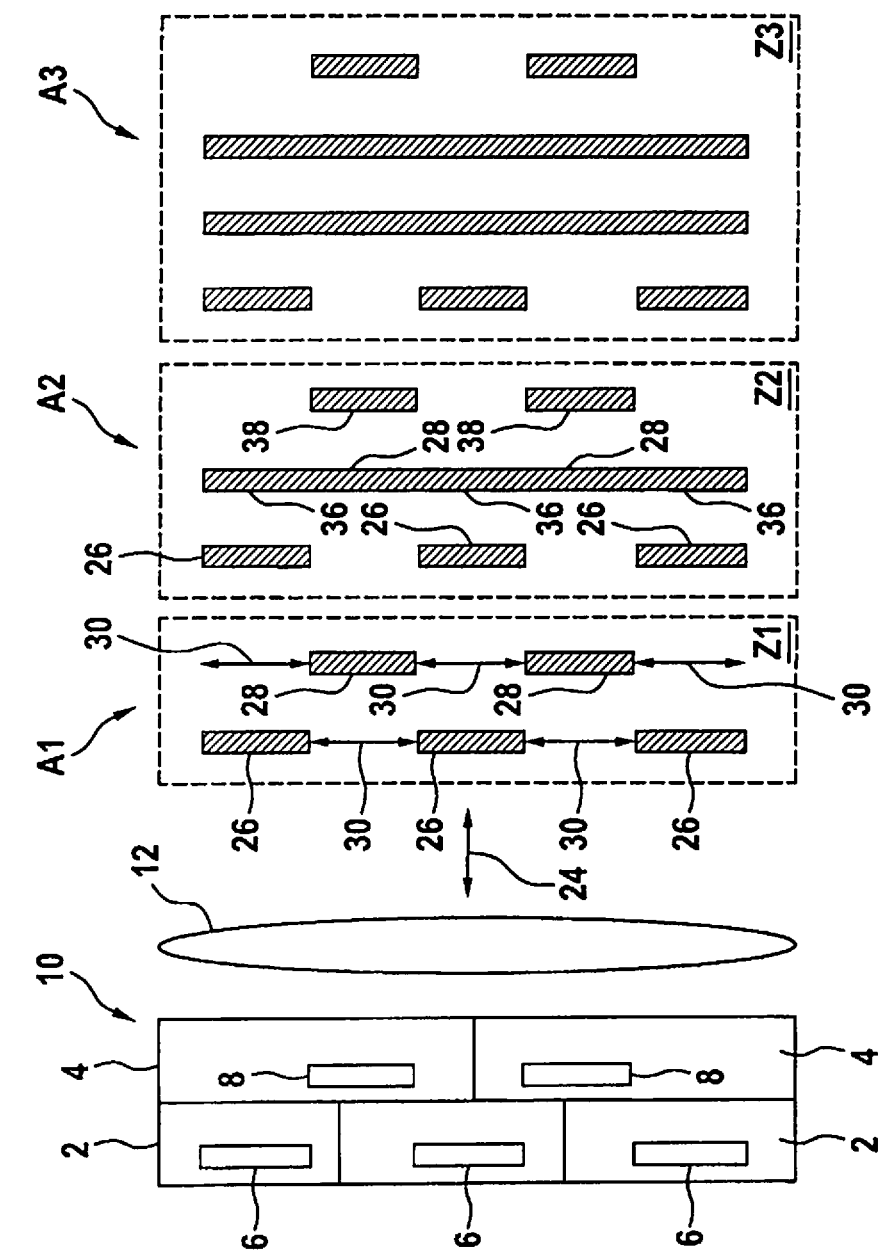
FIG. 2 shows a schematic representation of the method according to a first exemplary embodiment.

FIG. 2 elucidates a schematic representation of a method according to a first exemplary embodiment. Beam source stack 10 including the optical system 12 are shown here in particular. According to the exemplary embodiment, the beam source stack 10 is made up of a first beam source bar, which is made up of three first beam sources 2, and a second beam source bar, which is made up of two second beam sources 4. Each beam source 2, 4 has its own emission surface 6, 8. Beam source 2, 4 and thus also emission surfaces 6, 8 of the two beam source bars are offset with respect to each other in such a way that emission surfaces 6, 8 form a checkered pattern. Emission surfaces 6, 8 are projected over a distance 24 of 100 m for example via optical system 12 and deflection unit 14, which is not shown here for reasons of clarity. In a first time step Z1, the projection A1 at distance 24 of the individual emission surfaces 6, 8 is visible and detectable by detector 20. Here, the emission surfaces 26, 28 projected in first time step Z1 have spaces 30 with respect to one another. These spaces 30 are scanning gaps 30. In a second time step Z2, the beams 5 generated by emission surfaces 6, 8 were deflected by deflection unit 14. Projection A2, which is cumulated or combined by detector 20 with projection A1 at time Z1 now includes the projected emission surfaces 26, 28 from first time Z1 and the emission surfaces 36, 38 projected at second time Z2. At second time Z2, scanning gaps 30 of second emission surfaces 8, 28 are closed by projected emission surfaces 36 of first emission surfaces 6. This process is now repeated continuously or in stepwise fashion until the scan angle has been scanned or illuminated. In a third time step Z3, for example, most gaps 30 between the projections of emission surfaces 26, 36, 28, 38 are illuminated. With a rising number of time steps, the number of complete and gapless illuminations rises as well. In two or more scanning processes over the entire scan angle, illumination gaps 30 of first time step Z1 are illuminated as well. Depending on the vertical extension of the beam source bar or of the entire stack 10, a deflection of deflection unit 14 in a vertical direction may be omitted entirely since it is possible to illuminate and detect a sufficiently large solid angle as scan angle. It is thereby possible to illuminate a large part of scanning gaps 30 already in a single scanning pass.

Figure 3:
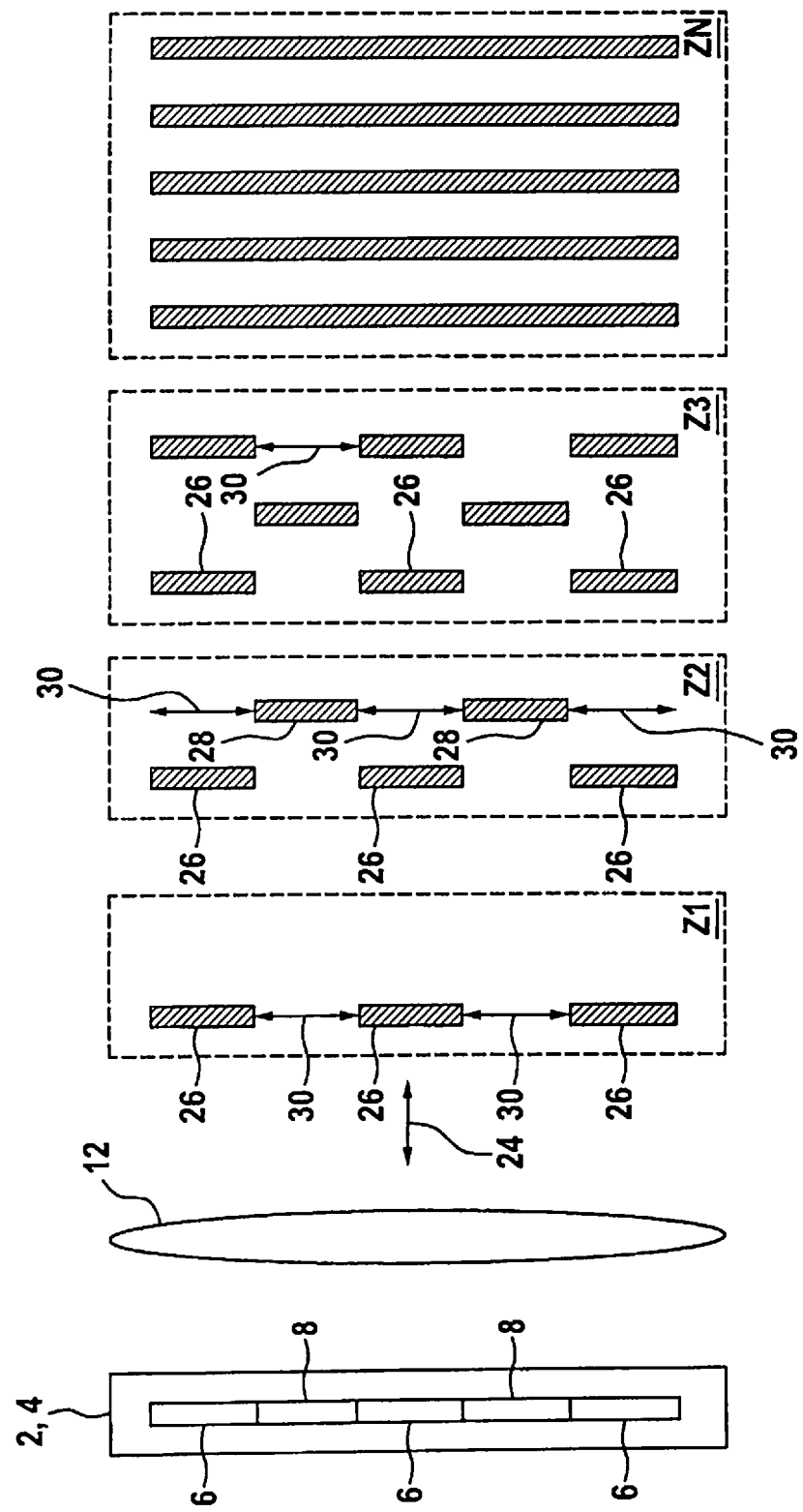
FIG. 3 shows a schematic representation of the method according to a second exemplary embodiment.

FIG. 3 shows a schematic representation of the method according to a second exemplary embodiment. According to the exemplary embodiment, the beam sources 2, 4 are developed as a beam source bar and have emission surfaces 6, 8 that are arranged directly side by side. Because of the formation of undesired modes, it is not possible to operate the gaplessly arranged emission surfaces 6, 8 simultaneously. Rather, in this instance, emission surfaces 6 of first beam sources 2 are activated in a first time step Z1 and are projected to emission surfaces 26. In a second time step Z2, deflection unit 14 is rotated onward by a defined angle. In second time step Z2, emission surfaces 8, 28 of second beam sources 4 are activated, while emission surfaces 6, 26 are deactivated. From reflected beams 7, detector 20 is able to join the received reflected beams 7. Even in a third time step Z3, all scanning gaps 30 exist between the projected emission surfaces 26, 28. Only after a second illumination pass of the scan angle at a time ZN are scanning gaps 30 illuminated. According to the exemplary embodiment, multiple scanning passes are required for complete illumination of the scan angle. On the other hand, beam source 2, 4 can have a simpler design in the form of a single beam source bar.

Figure 4B:
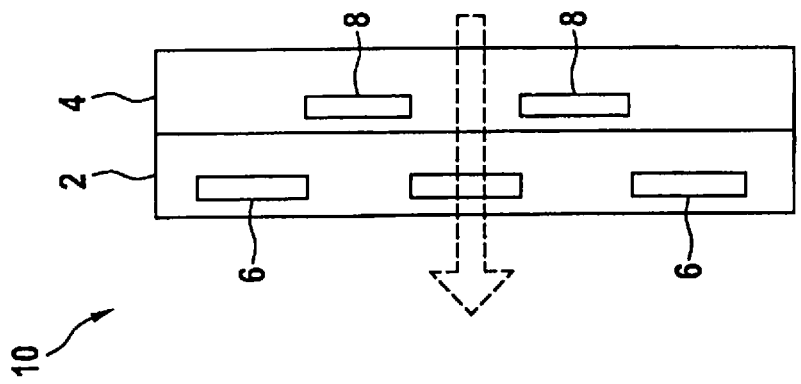

FIGS. 4a and 4b show schematic representations of beam source stacks 10. As shown in FIG. 4a, beam source stacks 10 may be composed of two unidirected beam sources 2, 4 or beam source bars. The arrow illustrates a current direction for activating emission surfaces 6, 8. Alternatively, FIG. 4b illustrates abeam source stack 10, which is composed of oppositely directed beam source bars or beam sources 2, 4. The two beam sources 2, 4 share a common electrode 32. Electrode 32 at the same time connects the two beam source bars to each other. As may be seen from the arrows, the current flow is directed from electrode 32 through the beam source bars into the edge regions. This type of construction having a common electrode 32 allows for the emission surfaces 6, 8 to be situated more closely together and thus increases a horizontal resolution of the system or LIDAR device 1.

What is claimed is:

1. A method for scanning a scan angle, the method comprising:
   generating, via a first beam source and a second beam source, at least two beams, wherein each of the beam sources each have one emission surface;
   deflecting the at least two beams along the scan angle, so that there is a gapless illumination of the scan angle;
   receiving at least two incident beams reflected on an object; and
   detecting, via at least one detector, the at least two incident beams;
   wherein the at least two beams are generated in an offset manner with respect to one another, and the at least two incident beams are detected in an offset manner with respect to one another,
   wherein the at least one detector includes multiple detector cells,
   wherein the beam sources are combined to form a stack, and
   wherein the emission surfaces are arranged in the offset manner with respect to each other and form an overlap area.

2. The method as recited in claim 1, wherein the at least two beams are generated in an angularly offset manner with respect to one another.

3. The method as recited in claim 1, wherein the at least two beams are generated in a spatially offset manner with respect to one another.

4. The method as recited in claim 1, wherein the at least two incident beams are detected in a spatially offset matter with respect to one another.

5. The method as recited in claim 1, wherein the at least two beams are generated in a time-staggered manner with respect to one another.

6. The method as recited in claim 1, wherein the at least two incident beams are detected in a time-staggered manner with respect to one another.

7. A LIDAR device for scanning a scan angle, comprising:
- at least two beam sources for generating at least two beams, wherein each of the beam sources each have one emission surface;
- a deflection unit for deflecting the at least two beams along the scan angle, so that there is a gapless illumination of the scan angle; and
- a receiving unit for receiving and guiding at least two incident beams reflected on an object onto at least one detector;
- wherein the at least two beam sources are situated so as to be offset with respect to one another and at least one first beam source of the at least two beam sources closes at least one scanning gap of at least one second beam source of the at least two beam sources,
- wherein the at least one detector includes multiple detector cells,
- wherein the beam sources are combined to form a stack, and
- wherein the emission surfaces are arranged in the offset manner with respect to each other and form an overlap area.

8. The LIDAR device as recited in claim 7, wherein the at least one first beam source closes the at least one scanning gap of the at least one second beam source in a time-staggered manner.

9. The LIDAR device as recited in claim 7, wherein the at least two beam sources are one of edge-emitting semiconductor lasers or surface-emitting semiconductor lasers.

10. The LIDAR device as recited in claim 9, wherein the at least one first beam source and the at least one second beam source are each developed as a bar and together form a stack.

11. The LIDAR device as recited in claim 10, wherein the at least two bars of the stack are connected to one another via at least one common electrode.

* * * * *